United States Patent
Dortch et al.

(10) Patent No.: US 9,516,208 B2
(45) Date of Patent: Dec. 6, 2016

(54) METHODS FOR ANALYZING THERMAL IMAGE DATA USING A PLURALITY OF VIRTUAL DEVICES AND METHODS FOR CORRELATING DEPTH VALUES TO IMAGE PIXELS

(71) Applicant: THERMAL IMAGING RADAR, LLC, Orem, UT (US)

(72) Inventors: Michael D. Dortch, Orem, UT (US); Larry J. Price, Orem, UT (US)

(73) Assignee: Thermal Imaging Radar, LLC, Orem, UT (US)

( * ) Notice: Subject to any disclaimer, the term of this patent is extended or adjusted under 35 U.S.C. 154(b) by 0 days.

(21) Appl. No.: 14/738,391

(22) Filed: Jun. 12, 2015

(65) Prior Publication Data

US 2015/0334303 A1 Nov. 19, 2015

Related U.S. Application Data

(63) Continuation-in-part of application No. PCT/US2014/049986, filed on Aug. 6, 2014.

(60) Provisional application No. 61/864,196, filed on Aug. 9, 2013.

(51) Int. Cl.
*H04N 5/232* (2006.01)
*G03B 37/02* (2006.01)
(Continued)

(52) U.S. Cl.
CPC .............. *H04N 5/232* (2013.01); *G03B 37/02* (2013.01); *G06T 3/4038* (2013.01);
(Continued)

(58) Field of Classification Search
CPC ...... G03B 37/02; G06T 3/4038; H04N 3/04; H04N 5/23238; H04N 5/2628; H04N 5/33; H04N 5/232
USPC .......................................................... 348/37
See application file for complete search history.

(56) References Cited

U.S. PATENT DOCUMENTS 3,336,810 A 8/1967 Schaffer et al.
3,648,384 A 3/1972 Roberts
(Continued)

FOREIGN PATENT DOCUMENTS

KR 10-2009-0067762 6/2009
WO 2013/109976 7/2013
(Continued)

OTHER PUBLICATIONS

U.S. Appl. No. 14/652,006, filed Jun. 12, 2015, Dortch et al.
(Continued)

*Primary Examiner* — Francis G Geroleo
(74) *Attorney, Agent, or Firm* — Workman Nydegger

(57) ABSTRACT

Thermal imaging camera images are obtained from a thermal imaging camera that rotates through a plurality of stop positions. The camera captures images at a constant frame rate and at least some of the images correspond to stop positions. Thermal imaging camera images that correspond to a stop position are retained, while images that do not correspond to a stop position are discarded. Retained images are sent in a video stream to a video processor. The video stream is separated into individual thermal imaging camera images and stored for corresponding virtual camera devices that correspond to specific stop positions. In addition, the position of the camera and individual pixels of images are both correlated to geographical location data, and depth values for the pixels are determined based on the geographical data.

25 Claims, 7 Drawing Sheets

(51) Int. Cl.
*H04N 5/33* (2006.01)
*G06T 3/40* (2006.01)
*G03B 11/04* (2006.01)
*H04N 3/04* (2006.01)
*H04N 5/262* (2006.01)
*B29C 45/00* (2006.01)
*B29K 23/00* (2006.01)
*B29L 31/00* (2006.01)

(52) U.S. Cl.
CPC ........... *H04N 5/23238* (2013.01); *H04N 5/33* (2013.01); *B29C 45/0055* (2013.01); *B29C 2045/0058* (2013.01); *B29K 2023/0683* (2013.01); *B29K 2995/0029* (2013.01); *B29K 2995/0097* (2013.01); *B29L 2031/764* (2013.01); *G03B 11/041* (2013.01); *H04N 3/04* (2013.01); *H04N 5/2628* (2013.01)

(56) References Cited

U.S. PATENT DOCUMENTS

| | | | |
|---|---|---|---|
| 3,769,501 A | 10/1973 | McDonough | |
| 3,883,788 A | 5/1975 | Storey, Jr. | |
| 4,263,513 A | 4/1981 | Palluet | |
| 4,465,959 A | 8/1984 | Yajima | |
| 4,602,857 A | 7/1986 | Woltz et al. | |
| 4,710,691 A | 12/1987 | Bergstrom | |
| 4,922,275 A | 5/1990 | Hughes | |
| 4,977,323 A * | 12/1990 | Jehle | G02B 23/12 250/332 |
| 4,982,218 A | 1/1991 | Tsuboi et al. | |
| 5,453,618 A * | 9/1995 | Sutton | H04N 3/09 250/332 |
| 5,598,207 A | 1/1997 | Kormos | |
| 5,650,813 A * | 7/1997 | Gilblom | G02B 23/08 348/295 |
| D381,997 S | 8/1997 | Morooka | |
| 5,752,113 A | 5/1998 | Borden | |
| 5,790,183 A | 8/1998 | Kerbyson | |
| 5,807,950 A | 9/1998 | Da Silva | |
| 6,023,588 A * | 2/2000 | Ray | G03B 35/08 348/E13.014 |
| 6,034,716 A * | 3/2000 | Whiting | H04N 5/2259 348/36 |
| 6,088,534 A | 7/2000 | Tominaga | |
| 6,133,943 A * | 10/2000 | Needham | G06T 3/4038 348/37 |
| D435,577 S | 12/2000 | McBride | |
| 6,304,284 B1 * | 10/2001 | Dunton | G06T 3/4038 348/36 |
| 6,388,414 B1 | 5/2002 | Kobayashi | |
| D482,712 S | 11/2003 | Hsu | |
| 6,677,982 B1 * | 1/2004 | Chen | G06T 3/4038 348/36 |
| D486,847 S | 2/2004 | Uehara | |
| 6,738,073 B2 | 5/2004 | Park et al. | |
| 6,809,887 B1 * | 10/2004 | Gao | G02B 13/06 348/48 |
| 6,948,402 B1 | 9/2005 | Amendolea | |
| 6,991,384 B1 | 1/2006 | Davis | |
| 6,992,722 B2 | 1/2006 | Jung | |
| D520,548 S | 5/2006 | Tsai | |
| D543,644 S | 5/2007 | Bembridge | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 | 10/2008 | Sim et al. | |
| 7,525,567 B2 * | 4/2009 | McCutchen | H04N 5/2251 348/36 |
| 7,561,187 B2 * | 7/2009 | Umezaki | H04N 5/23238 348/211.3 |
| 7,732,771 B2 | 6/2010 | Hasegawa et al. | |
| D640,721 S | 6/2011 | Satine | |
| 7,991,575 B2 | 8/2011 | Vogel et al. | |
| 8,106,936 B2 | 1/2012 | Strzempko et al. | |
| 8,194,912 B2 | 6/2012 | Kitaura et al. | |
| 8,285,512 B2 | 10/2012 | Vogel et al. | |
| D673,988 S | 1/2013 | Riegl | |
| 8,355,042 B2 | 1/2013 | Lablans | |
| 8,594,483 B2 * | 11/2013 | Koyanagi | H04N 5/232 386/224 |
| D695,809 S | 12/2013 | Katori | |
| 8,773,503 B2 | 7/2014 | Dortch et al. | |
| D728,655 S | 5/2015 | Daniel | |
| 9,071,740 B1 * | 6/2015 | Duffy | H04N 5/2252 |
| D741,388 S | 10/2015 | Register | |
| 2001/0026684 A1 | 10/2001 | Sorek et al. | |
| 2001/0027456 A1 | 10/2001 | Lancaster et al. | |
| 2002/0025023 A1 | 2/2002 | Herold et al. | |
| 2002/0185926 A1 | 12/2002 | King | |
| 2003/0025599 A1 | 2/2003 | Monroe | |
| 2003/0174056 A1 | 9/2003 | Harshaw | |
| 2004/0075741 A1 | 4/2004 | Berkey et al. | |
| 2004/0155558 A1 | 8/2004 | Cuttino | |
| 2004/0179098 A1 | 9/2004 | Haehn | |
| 2004/0183941 A1 | 9/2004 | McCutchen | |
| 2004/0257026 A1 | 12/2004 | Rogers | |
| 2005/0261820 A1 | 11/2005 | Feeney | |
| 2007/0115527 A1 | 5/2007 | Lee | |
| 2008/0106593 A1 | 5/2008 | Arfvidsson et al. | |
| 2008/0159732 A1 | 7/2008 | Young | |
| 2009/0051310 A1 | 2/2009 | Chandhoke | |
| 2010/0091089 A1 | 4/2010 | Cromwell et al. | |
| 2010/0097444 A1 | 4/2010 | Lablans | |
| 2010/0142757 A1 | 6/2010 | Sandstrom et al. | |
| 2011/0058036 A1 * | 3/2011 | Metzger | H04N 7/181 348/143 |
| 2011/0174762 A1 | 7/2011 | Tsai | |
| 2011/0220797 A1 | 9/2011 | Hoelter et al. | |
| 2011/0316970 A1 | 12/2011 | Cheong | |
| 2012/0127169 A1 | 5/2012 | Barcay et al. | |
| 2012/0133639 A1 | 5/2012 | Kopf et al. | |
| 2012/0155744 A1 * | 6/2012 | Kennedy | A63F 13/10 382/154 |
| 2012/0194564 A1 | 8/2012 | White et al. | |
| 2012/0293334 A1 | 11/2012 | Yu | |
| 2012/0299920 A1 | 11/2012 | Coombe et al. | |
| 2012/0300019 A1 | 11/2012 | Yang et al. | |
| 2012/0314066 A1 | 12/2012 | Lee et al. | |
| 2012/0320148 A1 | 12/2012 | Unger | |
| 2013/0002807 A1 | 1/2013 | Vogel et al. | |
| 2013/0030699 A1 | 1/2013 | Barnes et al. | |
| 2013/0048855 A1 | 2/2013 | Abreo | |
| 2013/0079955 A1 | 3/2013 | Masiello et al. | |
| 2013/0103303 A1 | 4/2013 | Lynch | |
| 2013/0113827 A1 | 5/2013 | Forutanpour et al. | |
| 2013/0176130 A1 | 7/2013 | Hoesl | |
| 2013/0188010 A1 | 7/2013 | Dortch et al. | |
| 2014/0192184 A1 | 7/2014 | Wu | |
| 2015/0062337 A1 | 3/2015 | Scalisi | |
| 2015/0365607 A1 * | 12/2015 | Yang | G06K 9/20 348/164 |

FOREIGN PATENT DOCUMENTS

| | | |
|---|---|---|
| WO | WO 2013/109742 A1 | 7/2013 |
| WO | 2014/169061 | 10/2014 |
| WO | 2014/169066 | 10/2014 |
| WO | 2015/021186 | 2/2015 |

OTHER PUBLICATIONS

U.S. Appl. No. 14/652,009, filed Jun. 12, 2015, Dortch et al.
U.S. Appl. No. 14/456,329, filed Aug. 11, 2014, Dortch.
U.S. Appl. No. 29/523,032, filed Apr. 6, 2015, Dortch et al.
Chu, Elbert. "Invention Awards 2014: 360-Degree Infrared Vision." Popular Science. May 5, 2014. Web. Accessed Feb. 27, 2015.
U.S. Appl. No. 13/745,514, Jan. 10, 2014, Office Action.
U.S. Appl. No. 13/745,514, Apr. 11, 2014, Notice of Allowance.
U.S. Appl. No. 14/456,329, May 14, 2015, Restriction Requirement.
U.S. Appl. No. 14/456,329, Oct. 1, 2015, Office Action.

(56) References Cited

OTHER PUBLICATIONS

U.S. Appl. No. 14/652,009, Nov. 18, 2015, Office Action.
U.S. Appl. No. 14/652,006, Nov. 20, 2015, Office Action.
U.S. Appl. No. 14/456,329, Jan. 21, 2016, Notice of Allowance.
U.S. Appl. No. 14/652,006, Mar. 22, 2016, Final Office Action.
U.S. Appl. No. 14/652,009, Apr. 18, 2016, Notice of Allowance.
U.S. Appl. No. 29/523,032, Apr. 21, 2016, Office Action.
U.S. Appl. No. 14/652,006, Jul. 12, 2016, Office Action.

* cited by examiner

METHODS FOR ANALYZING THERMAL IMAGE DATA USING A PLURALITY OF VIRTUAL DEVICES AND METHODS FOR CORRELATING DEPTH VALUES TO IMAGE PIXELS

CROSS-REFERENCE TO RELATED APPLICATIONS

This application is a continuation-in-part of Patent Cooperation Treaty Application Number PCT/US2014/049986, which claims the benefit of U.S. Provisional Application No. 61/864,196 filed Aug. 9, 2013, each of which is incorporated herein by reference in its entirety.

BACKGROUND

Panoramic images can be created by an array of wide angle cameras that together create up to a 360 degree field of view or by one camera with a fish eye lens or other panoramic mirror that allows for a continuous "mirror ball" image that is later flattened out by computer. These images are limited in their ability to provide detail necessary to be useful for video surveillance because the sensors are stretched over wide fields of view (sometimes a full 360 degrees).

A relatively new means of capturing thermal panoramic images is by continuously spinning a cryogenically cooled thermal sensor or other high speed camera at less than 60 RPM and processing the images from the camera with a computer where they are stitched together and analyzed. These cryogenically cooled sensors have the ability to capture images in just a few nanoseconds, which allows them to produce near real time video. However, these cooled sensors are power hungry and expensive, making them impractical in many applications. In addition, the high speed cameras have very large lighting requirements making them of very limited use in other than full daylight conditions.

Even with existing advancements in the art, there still exists a need for improved camera systems and analysis methods, particularly for those which exhibit minimal complexity and cost, and which can operate under relatively low power requirements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present invention comprise systems, methods and computer program products configured to sort and analyze individual image frames of panoramic image data using a plurality of virtual devices. For example, an embodiment of the present invention is directed to an on-site system for analyzing and sorting individual image frames of panoramic image data using a plurality of virtual devices. Such a system may include an indexing mechanism on which a thermal imaging camera is mounted for rotating the camera through a plurality of stop positions, a thermal imaging camera, the thermal imaging camera being configured to take thermal imaging camera images, at least some of the thermal imaging camera images corresponding to stop positions as the thermal imaging camera rotates through the plurality of stop positions, and a multiplexing and analysis module configured to discard any thermal imaging camera images that do not correspond to any of the stop positions, so that those thermal imaging camera images that correspond to any stop position are retained. The multiplexing and analysis module may be configured to process a video stream of the retained thermal imaging camera images by separating the video stream of retained thermal imaging camera images into individual thermal imaging camera images, the retained thermal imaging camera images being stored for a corresponding virtual camera device. Each of the virtual camera devices may correspond to a specific stop position, and the virtual camera devices may be on-site relative to the thermal imaging camera. The multiplexing and analysis module may be configured to not stitch the retained thermal imaging camera images together into a panorama on-site, so that total power requirements for the on-site system including the thermal imaging camera, the indexing mechanism for rotating the camera, and the multiplexing and analysis module for sorting images for the virtual camera devices are no more than about 10 watts. The images may be stored on the on-site system, or off-site (e.g., and relayed on-site, if needed).

Another embodiment of the present invention comprises obtaining thermal imaging camera images from a thermal imaging camera that rotates through a plurality of stop positions. The camera may capture thermal imaging camera images at a constant frame rate. At least some of the thermal imaging camera images correspond to stop positions, while other captured thermal imaging camera images may not correspond to any stop position. Thermal imaging camera images corresponding to any of the stop positions are retained, while thermal imaging camera images that do not correspond to any stop position are discarded. Retained thermal imaging camera images are sent in a video stream to a video processor where they are separated into individual thermal imaging camera images and sorted for a corresponding virtual camera device that corresponds to the specific stop position to which the given image corresponds. Storage of the retained sorted images may be onsite. In another embodiment, storage may be off-site, and the images relayed on-site, as needed. The virtual camera devices are on-site, rather than remote, relative to the thermal imaging camera. The thermal imaging camera images are intentionally not stitched together on-site into a panoramic image on-site, so that the total power requirements of the on-site system (e.g., including the thermal imaging camera, an indexing mechanism for rotating the camera, and a multiplexing and analysis module for sorting images for the virtual camera devices) are no more than about 10 watts.

Discarding images that do not correspond to any stop position may allow the video processor to periodically sleep because it never receives those images, thus making the system more power efficient. Similarly, because on-site analytics are limited to relatively simple functions (e.g., not stitching images together, but to stop and stare at a given location to see what may be occurring, etc.), the system exhibits relatively limited power consumption characteristics. For example, the on-site system may require less than about 10 watts, and can be left unattended for a period of years, and can be powered by batteries charged by relatively small solar cells.

In another aspect, the present invention relates to a method for correlating geographical location data including determination of depth values (i.e., distance from the camera) for pixel positions of an individual image frame of a panoramic image. The method may comprise the steps of obtaining camera images (e.g., thermal imaging camera images) from a single camera that rotates through a plurality of stop positions. The camera may capture images at a constant frame rate, at least some of the images corresponding to stop positions as the camera rotates through the plurality of stop positions. A position of the camera may be correlated with geographical location data, pixel positions of a given camera image may be correlated with geographical location data, and depth values for pixel positions of the given camera image may be determined based at least in part on the geographical location of the camera and the orientation or position in which the given stop position is "pointed".

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 5A:
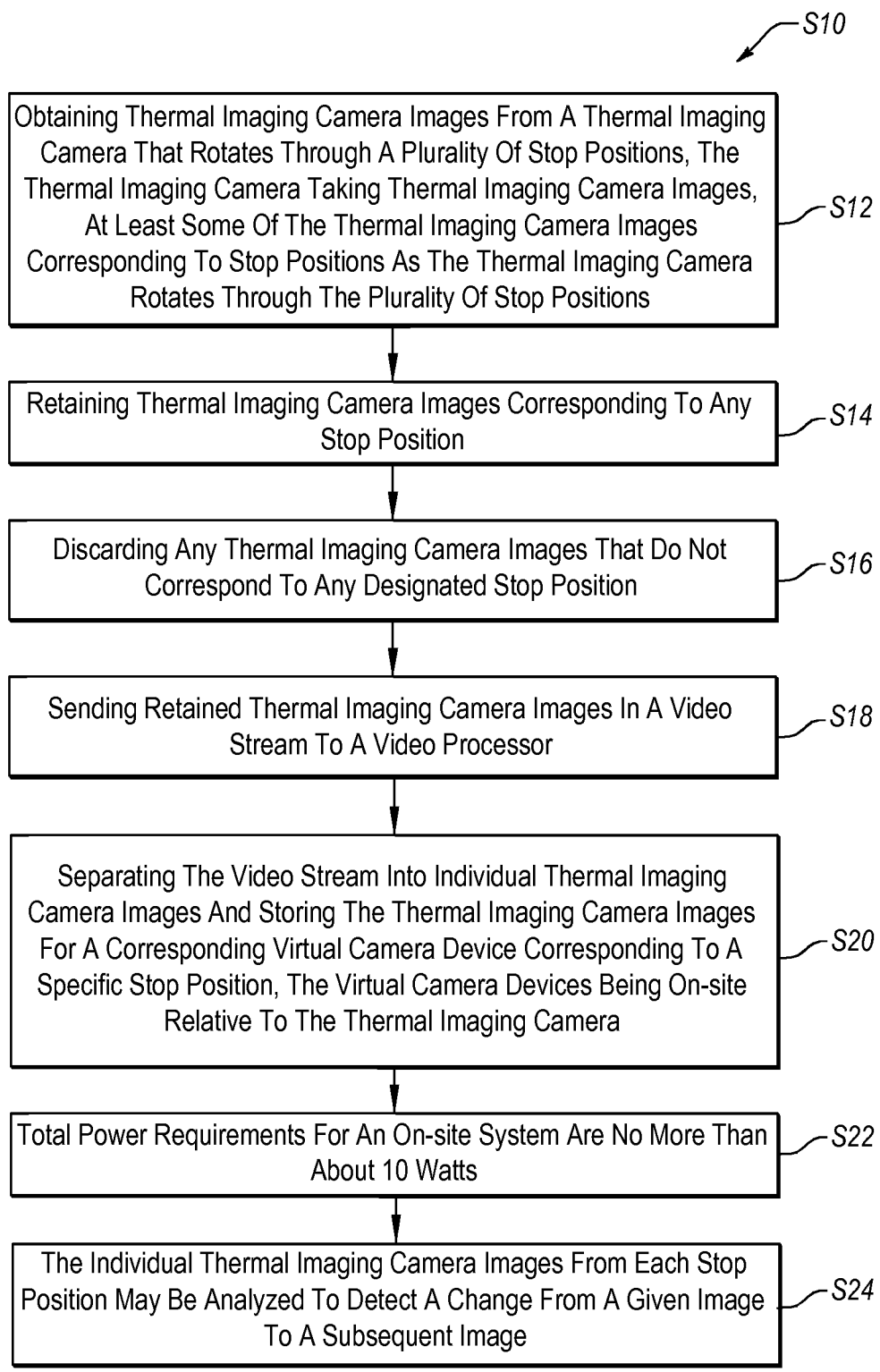
FIG. 5A is a flowchart illustrating an exemplary method.

Implementations of the present invention comprise systems, methods and computer program products configured to sort and analyze individual image frames of panoramic image data using a plurality of virtual devices. For example, as shown in FIG. 5A, an embodiment of the present invention comprises a method S10 of obtaining thermal imaging camera images from a thermal imaging camera that rotates through a plurality of stop positions (S12). The camera may capture thermal imaging camera images at a constant frame rate. At least some of the thermal imaging camera images correspond to stop positions, while other captured thermal imaging camera images may not correspond to any stop position. Thermal imaging camera images corresponding to any of the stop positions are retained (S14), while thermal imaging camera images that do not correspond to any stop position are discarded (S16).

Retained thermal imaging camera images are sent in a video stream to a video processor (S18). They may be separated into individual thermal imaging camera images, sorted, and stored for a corresponding virtual camera device that corresponds to the specific stop position to which the given image corresponds (S20). For example, the on-site system may include appropriate memory for storing the images. Alternatively, some or all of the images may be stored off-site and relayed on-site as needed. The virtual camera devices may be on-site relative to the thermal imaging camera. The thermal imaging camera images are not stitched together on-site into a panoramic image on-site, so that the total power requirements of the on-site system (e.g., including the thermal imaging camera, an indexing mechanism for rotating the camera, and a multiplexing and analysis module for sorting images for the virtual camera devices) are no more than about 10 watts (S22).

The individual thermal imaging camera images from each stop position may be analyzed as a video stream to detect a change from a given image to a subsequent image (S24).

Discarding images that do not correspond to any stop position may allow the video processor to periodically sleep because it never receives those images, thus making the system more power efficient. Similarly, because on-site analytics are limited to relatively simple functions (e.g., not stitching images together, etc.), the system exhibits relatively limited power consumption characteristics (e.g., less than about 10 watts, can be left unattended for a period of years and can be powered by batteries charged by relatively small solar cells).

Figure 5B:
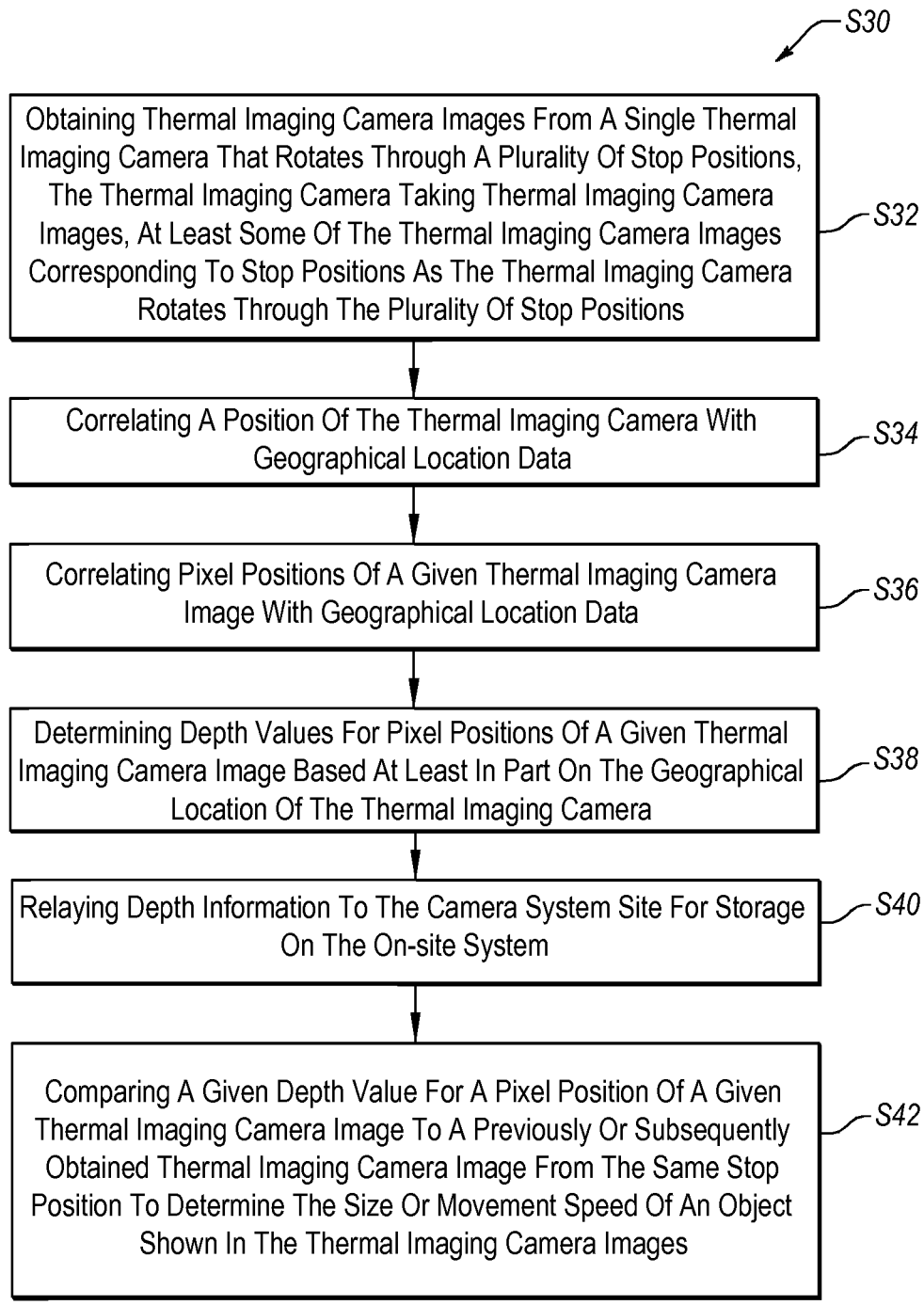
FIG. 5B is a flowchart illustrating another exemplary method according to the present invention.

In another aspect, the present invention relates to a method (S30—as shown in FIG. 5B) for correlating geographical location data including determination of depth values for pixel positions of an individual image frame of a panoramic image. The method may comprise the steps of obtaining camera images (e.g., thermal imaging camera images) from a single camera that rotates through a plurality of stop positions (S32). The camera may capture images at a constant frame rate, at least some of the images corresponding to stop positions as the camera rotates through the plurality of stop positions. A position of the camera may be correlated with geographical location data (S34), pixel positions of a given camera image may be correlated with geographical location data (S36), and depth values for pixel positions of the given camera image may be determined based at least in part on the geographical location of the camera and the orientation or position in which the given stop position is "pointed" (S38).

Optionally, depth information determinations (e.g., calculations) may be performed off-site, and relayed back to the camera system site for storage on-site (S40). In other words, the analytics and processing that correlates positions of an image with location data, determining the appropriate depth value for each pixel may be performed off-site, and the results may be relayed to the on-site system for use by the camera system, further reducing power requirements of the on-site system.

In use, a given depth value for a pixel position of a given thermal imaging camera image may be compared to a previously or subsequently obtained thermal imaging camera image from the same stop position to determine any changes, e.g., the size or movement speed of an object shown in the thermal imaging camera images (S42).

Although the subject matter is described in language specific to structural features and/or methodological acts, it is to be understood that the subject matter defined in the appended claims is not necessarily limited to the described features or acts described herein, or the order of the acts described herein. Rather, the described features and acts are disclosed as example forms of implementing the claims.

Figure 1:
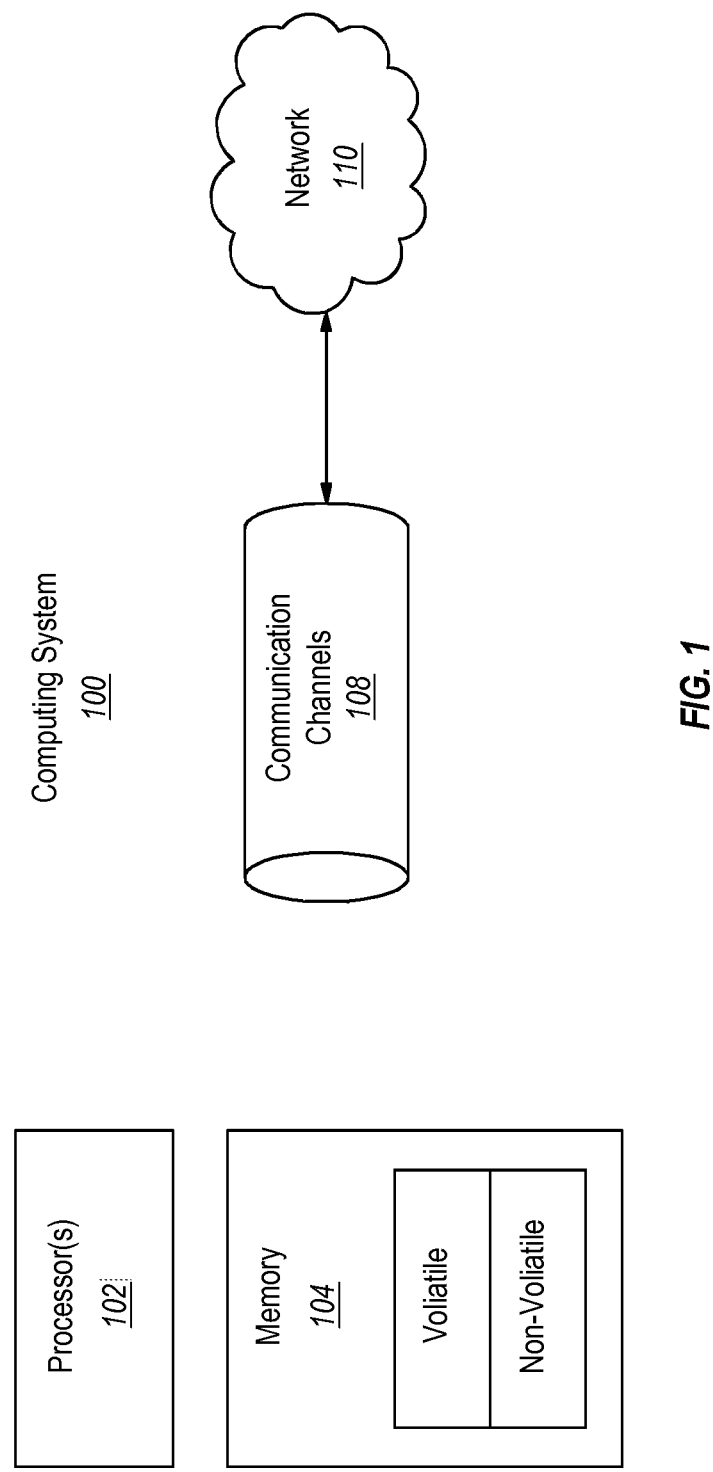
FIG. 1 schematically illustrates an example computing system in which the principles described herein may operate.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the FIG. 1 illustrates an exemplary computing system 100. In its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

Each of the computer systems described herein may be connected to one another over (or may be part of) a network, such as, for example, a Local Area Network ("LAN"), a Wide Area Network ("WAN"), and even the Internet. Accordingly, each of the described computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has traditionally been volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media includes recordable-type storage devices, such as RAM, ROM, EEPROM, solid state drives ("SSDs"), flash memory, phase-change memory ("PCM"), optical disk storage, magnetic disk storage or other magnetic storage devices, or any other physical hardware storage medium(s) which can be used to store program code in the form of computer-executable instructions or data structures, and which can be accessed and executed by a general-purpose or special-purpose computer system to implement the functionality described herein.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

I. Virtual Camera Devices

Figure 2:
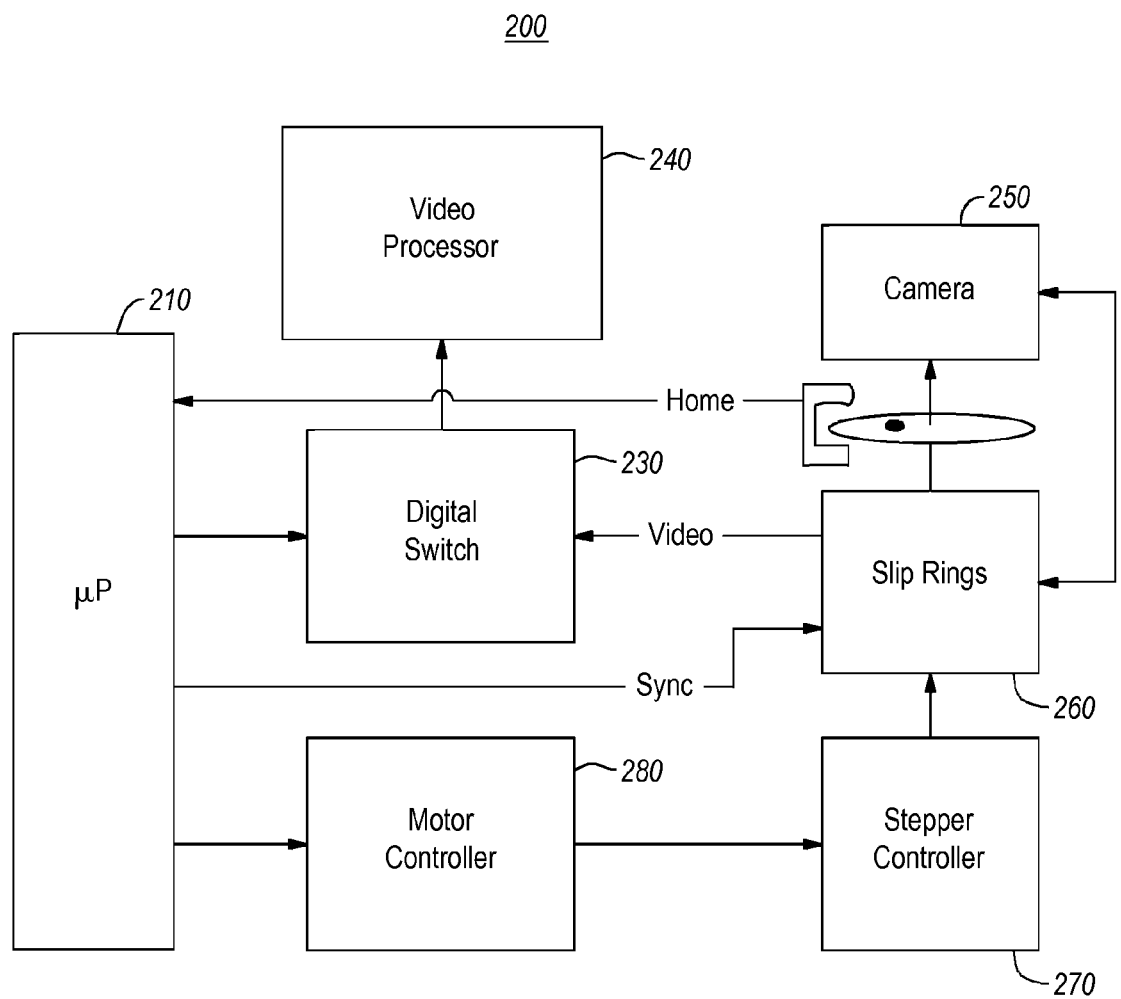
FIG. 2 schematically illustrates a specific environment in which the principles described herein may operate.

FIG. 2 illustrates a block diagram for camera system 200. Camera system 200 allows camera 250 (e.g., a thermal imaging camera) to rotate up to a full 360° around a fixed-axis. The full revolution comprises a number of positions corresponding to "stops" where it is desired that an image be captured. Because of requirements related to camera calibration, particularly with a thermal imaging camera, the camera can capture images at a constant frame rate. The spectrum captured may be from about 8000 nm to about 14000 nm. Of course, it may be possible to employ concepts disclosed herein within systems configured to capture and use image data based on other spectrums (e.g., visible light, higher or lower wavelengths). When capturing images at a constant frame rate, some of the images may correspond to positions between designated "stop" positions, while others will correspond to a "stop" position. As will be described in further detail hereafter, only those images corresponding to a "stop" position may be retained. The others may be discarded.

The positions where camera 250 captures images that will be retained are referred to herein as stop positions because camera 250 must be stationary, or momentarily stopped, in order for camera 250 to acquire a non-blurry image. A stop position can be characterized as having an angle offset relative to a designated home position (i.e., "stop" 1) at which camera 250 captures an image. In some implementations, the system may determine the home position by using a camera-mount with a hole, along with a transmissive optical encoder that can detect the home position when the hole in the camera-mount lines up with the encoder. Such a transmissive optical encoder may be a 1-bit encoder. In other implementations, a higher resolution encoder may be used to allow more granular feedback of actual camera position at any given time.

Camera system 200 can allow any number of stop positions per revolution. In an embodiment, the number of stop positions may be between 1 and 16. The stops may be positioned at equally spaced intervals. For example, ten stop positions, or stops, per revolution would result in ten stops that are located 36° apart. The camera system 200 may use any suitable motor mechanism for ensuring that the camera remains momentarily stationary at each stop position, so as to facilitate capture of a non-blurry image at each desired stop position. For example, a stepper motor may be employed to hold camera 250 stationary at each stop position for the appropriate amount of time to acquire an image before moving to the next stop position. Details of an exemplary stepper motor mechanism are disclosed in the inventors PCT Patent Application Serial No. PCT/US/2014/033539 filed Apr. 9, 2014 titled STEPPER MOTOR CONTROL AND FIRE DETECTION SYSTEM, herein incorporated by reference in its entirety. Another example of a motor mechanism that may be employed in rotating the camera through a plurality of stop positions in which the camera remains stationary momentarily at each stop position includes a mechanical cam system, e.g., as described in the inventors U.S. Pat. No. 8,773,503 issued Jul. 8, 2014 and titled AUTOMATED PANORAMIC CAMERA AND SENSOR PLATFORM WITH COMPUTER AND OPTIONAL POWER SUPPLY, herein incorporated by reference in its entirety. Motor mechanisms as described in the above patents and applications, as well as any other suitable design may be employed.

As depicted in FIG. 2, the system can utilize two processors, microprocessor 210 and video processor 240. Microprocessor 210 can manage position and timing of camera 250, while video processor 240 can process video from camera 250. Utilizing two processors allows the real-time performance of the camera 250 and motor synchronization by the microprocessor 210 to be de-coupled from the high-throughput video processor 240. Alternatively, some implementations may use one processor to manage position and timing, as well as video of the camera 250. Of course, more than two processors could alternatively be employed.

Figure 3A:
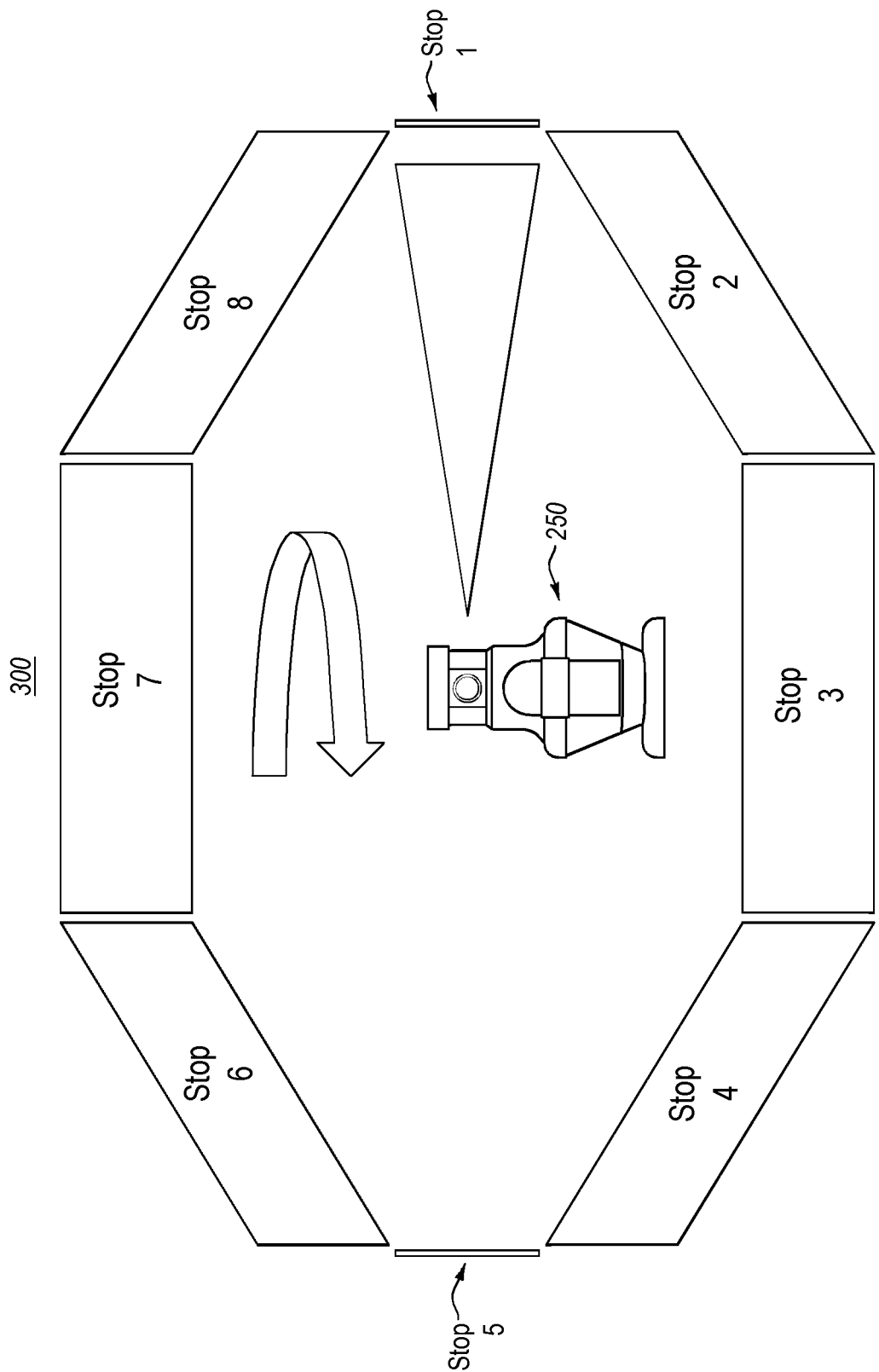
FIG. 3A schematically illustrates virtual camera positions, also referred to herein as stop positions, when rotating in a clockwise direction, with the camera pointed at stop position 1.
Figure 3B:
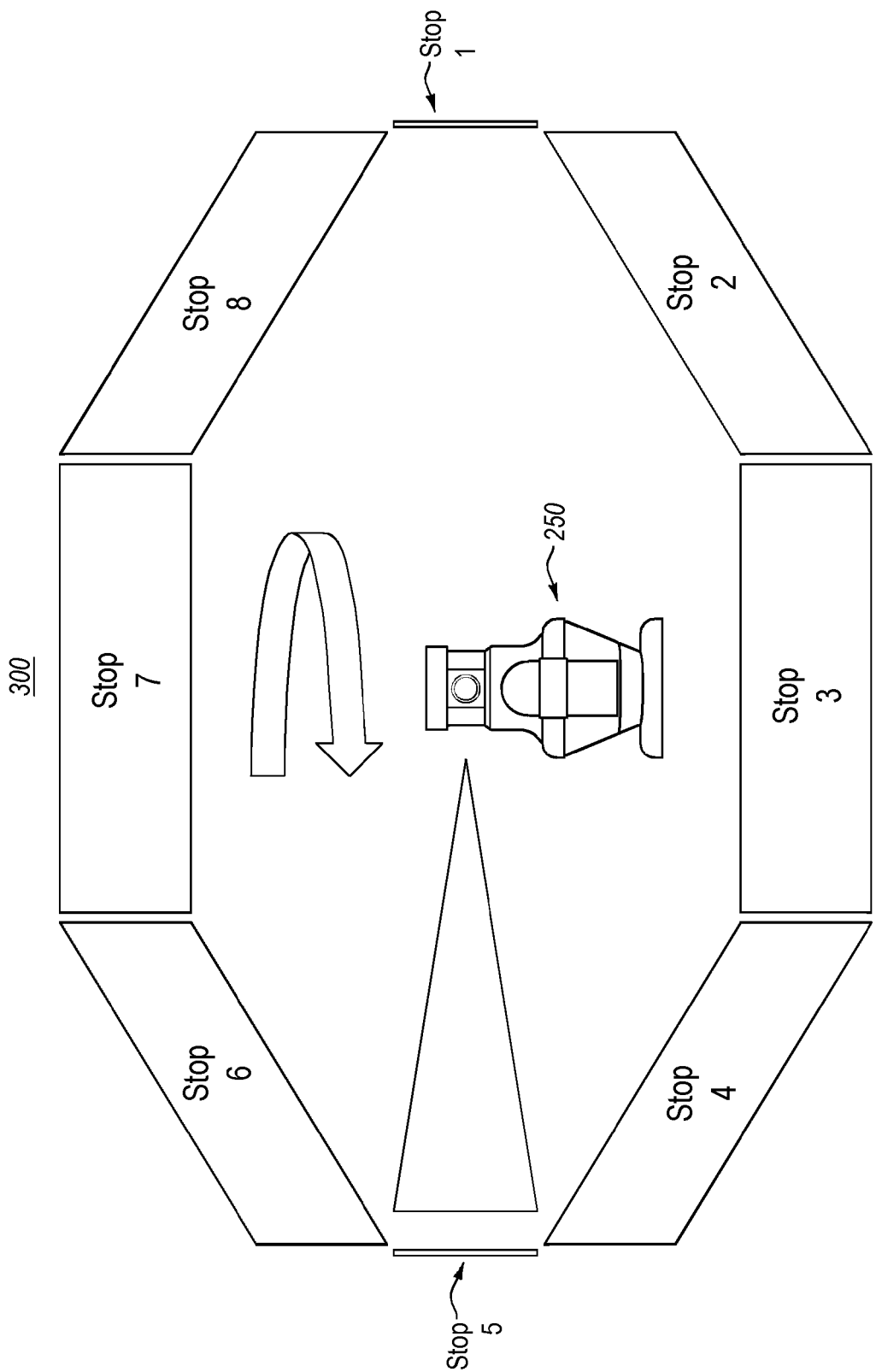
FIG. 3B schematically illustrates virtual camera positions, as in FIG. 3A, with the camera pointed at stop position 5.

In an implementation, data from the camera 250 passes through slip rings 260, which allows the camera 250 to rotate as described above (continuous rotation with intermittent, very short stops). Because the periods where the camera is actually stationary are so short, the camera may appear to rotate continuously. In some cases, the camera frame rate may not exactly match the rotational speed and stop rate of the camera system 200, thus creating fractional video frames. Digital switch 230 may then be used to throw away any unwanted video frames. In other words, as described above, some captured frames may correspond to one of the stop positions, while other captured frames may be captured while the camera is rotating. Using the digital switch 230 allows the video processor 240 to sleep during those times at which unwanted video frames are discarded, thus creating better power efficiency. Of course, in other embodiments of the system, the video processor (e.g., ARM/DSP) may have little or no time to sleep.

Where an image is taken at each stop position, each stop position can be represented as an individual virtual camera. A virtual camera may act like a stationary camera pointed in a single direction. The camera system 200 can support any number of stop positions and corresponding number of virtual cameras. In an embodiment, system 200 may include from 1 to 16 stop positions, and 1 to 16 virtual cameras, each virtual camera associated with a particular stop position. FIG. 3A illustrates how each stop position may correlate to a physical space with the camera 250 facing stop position 1 (i.e., home position). FIG. 3B shows the camera 250 having rotated so as to be facing stop position 5. As depicted in FIGS. 3A and 3B, a numbering system used for the stop positions may increase in a clockwise direction. FIGS. 3A and 3B illustrate an exemplary configuration including 8 stop positions, although it will be understood that more or fewer stop positions may be provided. By way of example, the number of stop positions may be from 2 to about 30, from 4 to about 20, or from 6 to about 16.

The period in which the camera is momentarily stopped may be any suitable period of time (e.g., may depend on the characteristics of the image capture capabilities of the camera). In an embodiment, each stop period (i.e., the dwell time) may be from about 30 ms to about 120 ms (e.g., about 60 ms).

Each image captured by camera 250 corresponding to a stop position may be multiplexed, or muxed, into a video stream and sent to video processor 240. Each image captured by camera 250 to be retained may be sent out of the camera over the same interface. Microprocessor 210 can manage and track the angle offset (and corresponding stop position) of camera 250 when an image to be retained is captured (i.e., the image corresponds to a stop position). Even images that are to be discarded (i.e., the image does not correspond to a stop position), may be sent to digital switch 230 over the same interface as retained images. At digital switch 230, those images that are to be discarded may be separated and discarded, rather than passed on to video processor 240.

Figure 4:
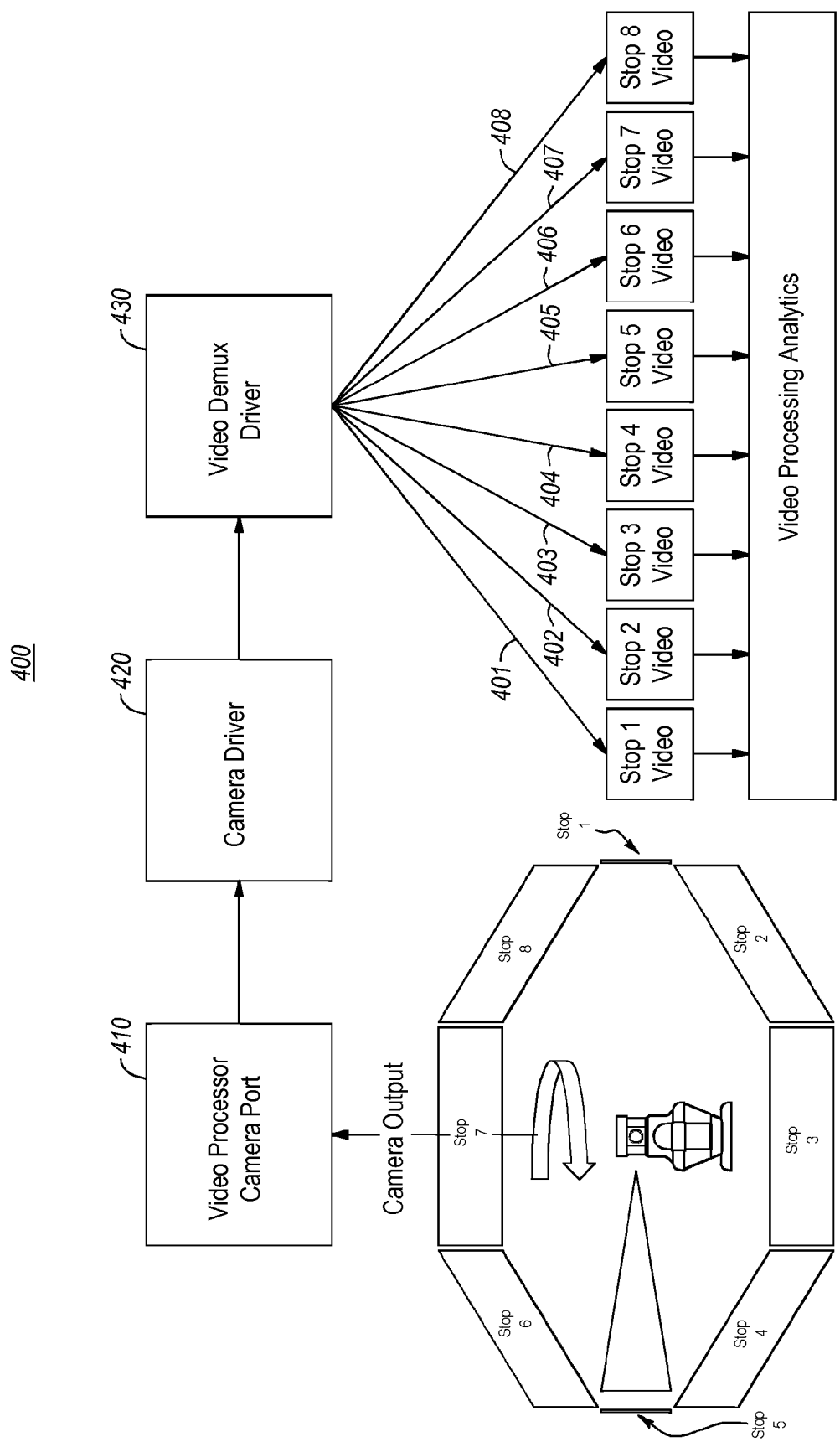
FIG. 4 schematically illustrates an implementation of the video processor described in FIG. 2.

An exemplary implementation showing how video processor 240 may operate is described in more detail in FIG. 4. Referring to FIG. 4, video demultiplexing driver 430 separates the video stream into individual images (i.e., frames) that each correspond to a particular stop position, or virtual camera. For example, the video stream referred to at this stage may include images to be retained that were captured at different stop positions. Demulitplexing driver 430 may use position information tracked by microprocessor 210 to determine the corresponding virtual camera for each image of the video stream, allowing sorting of the images to their proper virtual camera devices. As illustrated by FIG. 4, each image can be sent to its corresponding virtual camera (401-408) for storage and future analytics (e.g., comparison of images taken adjacent in time from the same stop position), once that determination has been made.

If desired, images from different stop positions may be stitched together to create a panoramic image (e.g., of up to 360°). An advantage of the present embodiments is that any such stitching is optional, and is typically not carried out on-site (if at all). If done, stitching may be done off-site, allowing the total power requirements for on-site system 200 to be no more than about 10 watts, as stitching is power and computer processor intensive.

In some implementations, the video stream associated with a given virtual camera device may be analyzed to detect a change from a given image to a subsequent image. In other words, rather than stitching together images to create a panoramic image, the analytics carried out may involve comparison of an image with a subsequently captured image (or a previously captured image) from the same stop position (and thus the same virtual camera device) to detect any changes (e.g., a change in temperature of an object, movement of an object, etc.). For example, the analytics carried out may include fire detection, as discussed in the inventors' prior PCT Patent Application Serial No. PCT/US/2014/033539 filed Apr. 9, 2014 titled STEPPER MOTOR CONTROL AND FIRE DETECTION SYSTEM, and PCT Patent Application Serial No. PCT/US/2014/033547 filed Apr. 9, 2014 titled FIRE DETECTION SYSTEM, each of which is herein incorporated by reference in its entirety.

By capturing thermal image data and subjecting the thermal image data to analytics, background masking can be simplified as compared to visible spectrum data, simplifying object identification.

Power may be supplied to the on-site system using batteries that are charged via solar cells, which can allow the system to be placed in a given location (e.g., remote, off the power grid) for long periods of time, such as up to two years or more. Lifespan may be shorter or longer than 2 years, depending on the system characteristics.

Each virtual camera can have a video stream similar to that which would be obtained by a stationary camera placed at the corresponding stop position. The system of virtual cameras may be on-site relative to thermal imaging camera 250. In some implementations, the frame rate of a virtual camera video stream is equal to the rotational speed of motor 270, as camera 250 passes each stop once per revolution. The muxed signal frame rate may be equal to a rotational speed of motor 270 multiplied by the number of stops per revolution. For example, a system running at 30 RPM with 16 stops per revolution would have a muxed frame rate of 8 frames per second (FPS) and each virtual camera device would have a frame rate of ½ FPS, or 1 frame per 2 seconds (e.g., 30 RPM/60 seconds in a minute=0.5 FPS).

Utilizing virtual cameras can allow analytics and any stitching to be decoupled from image acquisition. Because each virtual camera can have its own video stream, images associated with each virtual camera can be processed independently. System 200 may normally capture images in numerical (e.g., clockwise or counter-clockwise) order, but because the angle offset from home position (i.e., stop position 1) is known based on the stop number of the virtual camera, analytics or any stitching may update in any order desired.

II. Geographic Location Data

In some implementations, the position of camera 250 at which an image is captured can be correlated with actual geographical location data (e.g., GPS data). Once it is known where the actual camera 250 is located, based on geographical location data, the camera can be located on a 3D topography map. Similarly, depth values for individual pixels of a given frame of a given virtual camera device (i.e., stop position) may be determined. Corrections may be made for tilt and height.

Additional details of exemplary fire detection systems, including the ability to correlation of geographical location data and determination of depth values is found in PCT Patent Application Serial No. PCT/US/2014/033547 filed Apr. 9, 2014 titled FIRE DETECTION SYSTEM, already incorporated by reference in its entirety.

Correlating geographical location data with the position of camera 250 can include, but is not limited to, correlating pixel positions of a captured image and determining depth values for pixel positions of individual thermal imaging camera images based on the geographical location of thermal imaging camera 250. Given the elevation and orientation of thermal imaging camera 250, the distance or depth value for each pixel of an image may be calculated using elevation data, for example, from the National Elevation Dataset.

The depth value calculation to be associated with a given pixel can be done in a series of steps for determining (e.g., calculating) how each pixel represents a ray projected from the camera across the landscape intersecting the ground. Generally, this may be achieved by using a projected camera view on a wireframe terrain model created using elevation data (e.g., from the National Elevation Dataset) to estimate where each rendered pixel of the camera view would intersect the wireframe to calculate the probable "z" depth value of the bottom of each image element or pixel. Such a process may employ a loop process carried out through increasing z-distances until the projected height intersects the elevation height at a distance.

This may be done by determining (e.g., calculating) if a ray having a length equal to the camera's height intersects the ground at the projected distance. This determination may be repeated by repeatedly increasing the ray length by a given amount (e.g., 1 decimeter) until the ground is reached (e.g., intersected) or the ray exceeds a given length (e.g., 30 kilometers). Such an excessive length may be used to help render the horizon. Data for latitude, longitude, elevation and distance of the intersection point may be stored, and the determination (e.g., calculation) may be repeated for the next pixel of a column. Progressing upwardly from the bottom, within the image, once a column of pixels reaches the horizon, the determination may move onto a new column. Such determinations or calculations may be based off variable Vertical Field of View, Horizontal Field of View, elevation and orientation. The final data set may be used to render an image that depicts distance (e.g., in gray scale) with lines placed at a given distance (e.g., every 100 meters). The determined or calculated image may be compared against an actual image for a final adjustment of the input variables. Once completed, the final result would provide a "z" depth value map that can be saved for future immediate analytics availability.

Illustrative of the steps described above, an image of 640×512 may require repetition of the described determinations approximately 250,000 times.

Once depth values for pixel positions are determined, this may allow determination of the size or movement speed of an object captured within an image. For example, it may provide information on the size or movement speed of a wildfire. Processing that correlates pixel positions of an image with location data and determination of a depth value associated with each pixel may be performed off-site at a remote user interface terminal. The actual depth values associated with given pixels of the images may be relayed to the camera system for storage and use on-site.

Relay of any data on-site to off-site or vice versa may be by any suitable mechanism, e.g., including, but not limited to satellite link or network, cellular link or network, WiFi link or network, radio transmission, hard wired link or network, etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An on-site system for analyzing and sorting individual image frames of panoramic image data using a plurality of virtual devices, the on-site system comprising:
    an indexing mechanism on which a thermal imaging camera is mounted for rotating the thermal imaging camera through a plurality of stop positions;
    the thermal imaging camera, wherein the thermal imaging camera is configured to take thermal imaging camera images, at least some of the thermal imaging camera images corresponding to stop positions as the thermal imaging camera rotates through the plurality of stop positions;
    a multiplexing and analysis module configured to discard any thermal imaging camera images that do not correspond to any of the stop positions, so that those thermal imaging camera images that correspond to any stop position are retained;
    the multiplexing and analysis module being configured to process a video stream of the retained thermal imaging camera images by separating the video stream of retained thermal imaging camera images into individual thermal imaging camera images corresponding to specific stop positions and storing the retained thermal imaging camera images for a plurality of corresponding virtual camera devices;
    the plurality of virtual camera devices being on-site relative to the thermal imaging camera, each virtual camera device of the plurality of virtual camera devices corresponding to a specific stop position and each of the virtual camera devices having a separate, corresponding video stream each separate corresponding video stream comprising a plurality of images corresponding to a specific stop position;
    wherein the multiplexing and analysis module is configured to not stitch the retained thermal imaging camera images together into a panorama on-site, so that total power requirements for the on-site system including the thermal imaging camera, the indexing mechanism for rotating the camera, and the multiplexing and analysis module for sorting images for the virtual camera devices are no more than 10 watts.

2. The on-site system in accordance with claim 1, wherein the thermal imaging camera takes the thermal imaging camera images at a constant frame rate.

3. The on-site system in accordance with claim 1, wherein power is supplied to the on-site system by batteries which are charged via solar cells, allowing the on-site system to be placed in a location unattended for up to two years.

4. The on-site system in accordance with claim 1, wherein the multiplexing and analysis module comprises a first processor configured to manage position and timing of the thermal imaging camera, including tracking an angle offset relative to a home position at which a thermal imaging camera image is captured, and a second processor that is a video processor which is configured to process the video stream from the thermal imaging camera, including separating the video stream into individual thermal imaging camera images to be stored for a corresponding virtual camera device.

5. The on-site system in accordance with claim 4, wherein the on-site multiplexing and analysis module comprises a demultiplexing driver that separates the video stream of retained thermal imaging camera images, sorting the retained images to be stored for the corresponding virtual camera device.

6. The on-site system in accordance with claim 5, wherein the demultiplexing driver utilizes position information provided by the first processor to determine which stop position a given image corresponds to.

7. The on-site system in accordance with claim 1, wherein the multiplexing and analysis module comprises a digital switch that is configured to discard the thermal imaging camera images that do not correspond to any stop position, so that thermal imaging camera images corresponding to any stop position are retained.

8. The on-site system in accordance with claim 7, wherein the multiplexing and analysis module comprises a video processor that is configured to process the video stream of retained thermal imaging camera images by separating the video stream of retained thermal imaging camera images into individual thermal imaging camera images which are stored for a corresponding virtual camera device.

9. The on-site system in accordance with claim 8, wherein the retained thermal imaging camera images are sent from the camera to the digital switch of the multiplexing and analysis module through slip rings so that the camera can rotate continuously.

10. The on-site system in accordance with claim 8, wherein the digital switch receives both those images corresponding to any stop position and those images that do not correspond to any stop position, the digital switch discarding those images that do not correspond to any designated stop position, those images which correspond to any stop position being sent to the video processor.

11. The on-site system in accordance with claim 10, wherein the video processor only receives those images which correspond to any stop position, so that the video processor can sleep during discarding of images that do not correspond to any designated stop position by the digital switch, increasing the power efficiency of the on-site system.

12. The on-site system in accordance with claim 1, wherein the camera is physically stationary when capturing images corresponding to each stop position.

13. The on-site system in accordance with claim 1, wherein the camera is not physically stationary when capturing images that do not correspond to any designated stop position.

14. The on-site system in accordance with claim 1, wherein the on-site system includes from 1 to 16 stop positions and corresponding virtual camera devices.

15. The on-site system in accordance with claim 1, wherein each image captured by the camera is sent out of the camera over a same interface.

16. The on-site system in accordance with claim 1, wherein the on-site system is further configured to determine depth values for pixel positions of a given thermal imaging camera image.

17. A method for analyzing and sorting individual image frames of panoramic image data using a plurality of virtual devices, the method comprising:
 obtaining thermal imaging camera images from a thermal imaging camera that rotates through a plurality of stop positions, the thermal imaging camera taking thermal imaging camera images, at least some of the thermal imaging camera images corresponding to stop positions as the thermal imaging camera rotates through the plurality of stop positions;
 retaining thermal imaging camera images corresponding to any stop position;
 discarding any thermal imaging camera images that do not correspond to any designated stop position;
 sending retained thermal imaging camera images in a video stream to a video processor;
 separating the video stream into individual thermal imaging camera images and storing the thermal imaging camera images for a plurality of corresponding virtual camera devices, the plurality of virtual camera devices being on-site relative to the thermal imagine camera each virtual camera device corresponding to a specific stop position and each virtual camera device having a separate, corresponding video stream, each separate, corresponding video stream comprising a plurality of images corresponding to a specific stop position; and
 wherein the thermal imaging camera images are not stitched together into a panorama on-site so that total power requirements for an on-site system including the thermal imaging camera, an indexing mechanism for rotating the camera, and a multiplexing and analysis module for sorting images for the virtual camera devices are no more than 10 watts.

18. The method in accordance with claim 17, wherein the individual thermal imaging camera images from each stop position are analyzed as a video stream to detect a change from a given image to a subsequent image.

19. The method in accordance with claim 17, wherein the individual thermal imaging camera images from each stop position are stitched together to create up to a 360° panoramic image, the stitching being performed off-site, at a user interface.

20. The method in accordance with claim 17, further comprising:
 correlating a position of the thermal imaging camera with geographical location data;
 correlating pixel positions of a given thermal imaging camera image with geographical location data; and
 determining depth values for pixel positions of a given thermal imaging camera image based at least in part on the geographical location of the thermal imaging camera.

21. The method in accordance with claim 17, further comprising correlating geographical location data including determination of depth values for pixel positions of an individual image frame of a panoramic image, wherein correlating geographical location data including at least:
 correlating a position of the thermal imaging camera with geographical location data;
 correlating pixel positions of a given thermal imaging camera image with geographical location data; and
 determining depth values for pixel positions of a given thermal imaging camera image based at least in part on the geographical location of the thermal imaging camera.

22. The method in accordance with claim 21, wherein a given depth value for a pixel position of a given thermal imaging camera image is compared to a previously or subsequently obtained thermal imaging camera image from the same stop position to determine the size or movement speed of an object shown in the thermal imaging camera images.

23. The method in accordance with claim 21, wherein the processing that correlates pixel positions of an image with location data and determines a depth value associated with each pixel is performed off-site at a remote user interface terminal.

24. The method in accordance with claim 23, wherein depth information is relayed to the camera system site for storage on the on-site system.

25. An on-site system for analyzing and sorting individual image frames of panoramic image data using a plurality of virtual devices, The on-site system comprising:
- an indexing mechanism on which a thermal imaging camera is mounted for rotating the thermal imaging camera through a plurality of stop positions;
- the thermal imaging camera, wherein the thermal imaging camera is configured to take thermal imaging camera images, at least some of the thermal imaging camera images corresponding to stop positions as the thermal imaging camera rotates through the plurality of stop positions;
- a multiplexing and analysis module configured Co discard any thermal imaging camera images that do not correspond to any of the stop positions, so that those thermal imaging camera images that correspond to any stop position are retained;
- the multiplexing and analysis module being configured to process a video stream of the retained thermal imaging camera images by separating the video stream of retained thermal imaging camera images into individual thermal imaging camera images corresponding to specific stop positions and storing the retained thermal imaging camera images for a plurality of corresponding virtual camera devices;
- the plurality of virtual camera devices being on-site relative to the thermal imaging camera, each virtual camera device of the plurality of virtual camera devices corresponding to a specific stop position and each of the virtual camera devices having a separate, corresponding video stream, wherein each separate, corresponding video stream comprises a plurality of images corresponding to a specific stop position;
- wherein the multiplexing and analysis module is configured to not stitch the retained thermal imaging camera images together into a panorama on-site, so that total power requirements for the on-site system including the thermal imaging camera, the indexing mechanism for rotating the camera, and the multiplexing and analysis module for sorting images for the virtual camera devices are no more than 10 watts; and
- a video processor that only receives those images which correspond to any stop position, so that the video processor can sleep during discarding of images that do not correspond to any designated stop position by the digital switch, increasing the power efficiency of the on-site system.

* * * * *